United States Patent
Neto et al.

(10) Patent No.: US 11,306,701 B2
(45) Date of Patent: Apr. 19, 2022

(54) CONSTANT TORQUE CONTROL OF A WIND TURBINE USING AN ENERGY STORAGE SYSTEM

(71) Applicant: VESTAS WIND SYSTEMS A/S, Aarhus N (DK)

(72) Inventors: Julio Xavier Vianna Neto, Aarhus N (DK); Germán Claudio Tarnowski, Aarhus N (DK); Mads Blumensaat, Aarhus C (DK); Torben Petersen, Åbyhøj (DK); Søren Dalsgaard, Hadsten (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 16/954,084

(22) PCT Filed: Nov. 8, 2018

(86) PCT No.: PCT/DK2018/050291
§ 371 (c)(1),
(2) Date: Jun. 15, 2020

(87) PCT Pub. No.: WO2019/114894
PCT Pub. Date: Jun. 20, 2019

(65) Prior Publication Data
US 2021/0172419 A1    Jun. 10, 2021

(30) Foreign Application Priority Data
Dec. 15, 2017 (DK) .......................... PA 2017 70949

(51) Int. Cl.
*F03D 9/00*    (2016.01)
*H02P 9/04*    (2006.01)
(Continued)

(52) U.S. Cl.
CPC ......... *F03D 7/0284* (2013.01); *F03D 7/0224* (2013.01); *F03D 7/0276* (2013.01);
(Continued)

(58) Field of Classification Search
CPC .... F03D 7/0224; F03D 7/0276; F03D 7/0284; F03D 9/11; H02J 3/32; H02J 3/381; H02J 2300/28
See application file for complete search history.

(56) References Cited

U.S. PATENT DOCUMENTS 4,251,735 A * 2/1981 Coleman .................. H02M 7/48
                                                    307/46
4,251,736 A * 2/1981 Coleman .................. H02M 7/48
                                                    307/46
(Continued)

FOREIGN PATENT DOCUMENTS

| EP | 2101392 A2 | 9/2009 |
|---|---|---|
| WO | 9311604 A1 | 6/1993 |
| WO | 2019114894 A1 | 6/2019 |

OTHER PUBLICATIONS

PCT Notification of Transmittal of The International Search Report and The Written Opinion of The International Searching Authority, or the Declaration for Application No. PCT/DK2018/050291 dated Feb. 20, 2019.
(Continued)

*Primary Examiner* — Tulsidas C Patel
*Assistant Examiner* — Thomas K Quigley
(74) *Attorney, Agent, or Firm* — Patterson + Sheridan, LLP

(57) ABSTRACT

A method for controlling a wind turbine is disclosed. During full load operation, a power reference value, Pref, representing a power level to be supplied to the power grid by the wind turbine, is received, and the wind turbine is controlled in order to produce an output power which is at or near the
(Continued)

power reference value, Pref, while maintaining a constant torque on the generator. In the case that the produced output power of the wind turbine exceeds the power reference value, Pref, excess produced energy is stored in the energy storage system, and in the case that the produced output power of the wind turbine is below the power reference value, Pref, stored energy is retrieved from the energy storage system. A power level being equal to the power reference value, Pref, is supplied to the power grid.

14 Claims, 6 Drawing Sheets

(51) Int. Cl.
    *F03D 7/02*     (2006.01)
    *F03D 9/11*     (2016.01)
    *H02J 3/32*     (2006.01)
    *H02J 3/38*     (2006.01)

(52) U.S. Cl.
    CPC .................. *F03D 9/11* (2016.05); *H02J 3/32* (2013.01); *H02J 3/381* (2013.01); *H02J 2300/28* (2020.01)

(56) References Cited

U.S. PATENT DOCUMENTS

| | | | |
|---|---|---|---|
| 4,700,081 A | | 10/1987 | Kos et al. |
| 5,225,712 A | * | 7/1993 | Erdman ................ F03D 7/0276 |
| | | | 290/44 |
| 5,483,435 A | * | 1/1996 | Uchino .................... H02P 9/48 |
| | | | 363/127 |
| 5,663,627 A | * | 9/1997 | Ogawa ................ H02M 1/4225 |
| | | | 318/803 |
| 7,227,275 B2 | * | 6/2007 | Hennessy ............... H02J 3/381 |
| | | | 290/55 |
| 2005/0062290 A1 | | 3/2005 | Stahlkopf |
| 2006/0171086 A1 | | 8/2006 | Hennessy et al. |
| 2006/0273595 A1 | | 12/2006 | Avagliano et al. |

OTHER PUBLICATIONS

Danish Patent and Trademark Office First Technical Examination for Application No. PA 2017 70949 dated Apr. 19, 2018.
Faze Li M et al: Wind turbine-energy storage control system for delivering constant demand power shared by DFIGs through droop characteristic. 13th European Conference on Power Electronics and Applications, Sep. 2009, pp. 1-109 [Abstract Only].

* cited by examiner

CONSTANT TORQUE CONTROL OF A WIND TURBINE USING AN ENERGY STORAGE SYSTEM

FIELD OF THE INVENTION

The present invention relates to a method for controlling a wind turbine during full load operation. More particularly, the method according to the invention ensures that a substantially constant reference power level is supplied to a power grid, while reducing wear and loads on the wind turbine, in particular on the drivetrain and/or the pitch system of the wind turbine.

BACKGROUND OF THE INVENTION

Wind turbines are normally operated in various operating regimes, depending on the wind speed as seen from the rotor of the wind turbine. At wind speeds below a minimum wind speed, which is sometimes referred to as the cut-in wind speed, the wind turbine does not produce power. At wind speeds above the cut-in wind speed, the wind turbine starts producing power, but until a certain wind speed, which is sometimes referred to as the nominal wind speed, the energy available from the wind is not sufficient to allow the wind turbine to generate nominal power. Accordingly, at wind speeds between the cut-in wind speed and the nominal wind speed, the wind turbine is normally operated in such a manner that as much energy as possible is extracted from the wind. This regime is sometimes referred to as partial load operation.

At wind speeds above the nominal wind speed, the wind turbine is normally operated in such a manner that nominal power is produced, i.e. the power production of the wind turbine is limited to the nominal power level. This regime is sometimes referred to as full load operation.

Thus, during full load operation, the wind turbine is operated in order to obtain a constant output power. At the same time, the rotor speed is controlled in accordance with a reference value by means of pitching the wind turbine blades. However, the wind is inherently a stochastic source of energy, e.g. due to gusts, turbulence, etc., and therefore fluctuations may occur in the rotor speed, and potentially also in the power production of the wind turbine. If such power fluctuations are transferred to the power grid, it may cause instability of the power grid. Therefore, in order to prevent or limit the transfer of power fluctuations to the power grid, the wind turbine may be operated in such a manner that the torque on the generator is allowed to vary in response to fluctuations in the rotor speed, caused by fluctuations in the wind, thereby keeping the output power of the wind turbine substantially constant. However, this may have the consequence that wear and loads on the drivetrain and/or the pitch system are increased.

U.S. Pat. No. 8,478,449 B2 discloses a method of controlling the operation of a variable speed wind turbine. The generated power is controlled with a "measured" torque, and the "measured" torque is controlled with pitch through an adaptive predictive controller which identifies in real time the dynamics between the pitch action and the "measured" torque.

U.S. Pat. No. 7,952,232 B2 discloses a wind turbine energy storage device. Commands are generated for controlling a state of charge of the energy storage device being coupled between an energy source and an auxiliary load. Commands are also generated for providing from the energy storage device to the auxiliary load and for using power from the energy storage device for controlling a DC link voltage, energy source torque, grid side power flow, or combinations thereof.

DESCRIPTION OF THE INVENTION

It is an object of embodiments of the invention to provide a method for controlling a wind turbine during full load operation in a manner which reduces wear and loads on the drivetrain and/or pitch system while ensuring a constant power supply to a power grid.

The invention provides a method for controlling a wind turbine, the wind turbine comprising a rotor carrying a set of wind turbine blades and connected to an input shaft, an output shaft connected to a generator, the generator being arranged to supply power to a power grid, and an energy storage system for intermediate storage of energy produced by the generator, the method comprising the steps of:

during full load operation, receiving a power reference value, $P_{ref}$, representing a power level to be supplied to the power grid by the wind turbine, controlling the wind turbine in order to produce an output power which is at or near the power reference value, $P_{ref}$, while maintaining a constant torque on the generator, in the case that the produced output power of the wind turbine exceeds the power reference value, $P_{ref}$, storing excess produced energy in the energy storage system and supplying a power level being equal to the power reference value, $P_{ref}$, to the power grid, and in the case that the produced output power of the wind turbine is below the power reference value, $P_{ref}$, retrieving stored energy from the energy storage system and supplying a power level being equal to the power reference value, $P_{ref}$, to the power grid.

Accordingly, the invention relates to controlling a wind turbine during full load operation, as defined above. The wind turbine comprises a rotor carrying a set of wind turbine blades, the rotor being connected to an input shaft. Thus, the wind turbine blades cause rotation of the rotor, due to incoming wind acting on the wind turbine blades, and this rotational movement is transferred to the input shaft. The wind turbine further comprises an output shaft connected to a generator. Accordingly, rotating movements of the output shaft are transferred to a rotating part of the generator, thereby causing the rotating part of the generator to rotate relative to a stationary part of the generator, and thereby causing the generator to produce electrical power. The input shaft and the output shaft may be directly connected to each other, in which case the rotating movements of the rotor are transferred more or less directly to the rotating part of the generator. Such wind turbines are sometimes referred to as direct drive or gearless wind turbines. As an alternative, the input shaft may be connected to the output shaft via a gear system. In this case the rotational speed of the output shaft is typically higher than the rotational speed of the input shaft.

The generator is electrically connected to a power grid, and is thereby arranged to supply power generated in the manner described above to the power grid. The wind turbine further comprises an energy storage system for intermediate storage of energy produced by the generator. Accordingly, power generated by the generator may be either supplied directly to the power grid or supplied to the energy storage system. This will be described in further detail below.

According to the method of the invention, the wind turbine is operated under full load conditions, as defined above. A power reference value, $P_{ref}$, representing a power level to be supplied to the power grid by the wind turbine is received. The power reference value, $P_{ref}$, could, e.g., represent the nominal power level of the wind turbine. Alternatively, it could represent a different power level which is currently requested by the power grid. For instance, the wind turbine may be arranged in a wind power plant, i.e. a group of wind turbines arranged within a limited geographical site. The power grid may request a certain power level from the entire wind power plant, and in order to meet such a request, a wind power plant controller may request specific power levels from the individual wind turbines of the wind power plant. As another alternative, the power grid may request a certain power production, different from the nominal power of the wind turbine, from the wind turbine.

In response to the received power reference value, $P_{ref}$, the wind turbine is controlled in order to produce an output power which is at or near the power reference value, $P_{ref}$. Thus, the power production of the wind turbine is approximately equal to the power reference value, $P_{ref}$, but not necessarily exactly equal to the power reference value, Po. During this, a constant torque on the generator is maintained. Accordingly, contrary to the prior art methods where the power output is maintained constant with the consequence that the torque on the generator must be allowed to fluctuate in order to compensate for fluctuations in the rotor speed, in the method according to the invention, a constant torque is maintained on the generator, but the output power is allowed to fluctuate in order to compensate for fluctuations in the rotor speed.

It is an advantage that a constant torque is maintained on the generator, because this reduces wear and loads on the drivetrain and/or pitch system. However, as described above, the cost of this is a fluctuating power production, which needs to be addressed, because it prevents the wind turbine from delivering the requested output power to the power grid. This will be described in further detail below.

In the case that the produced power output of the wind turbine exceeds the power reference value, $P_{ref}$, excess produced energy is stored in the energy storage system, and a power level being equal to the power reference value, $P_{ref}$ is supplied to the power grid. Thus, in this case the wind turbine is allowed to generate a higher power level than the requested power level. However, only the requested power level is supplied to the grid, and the excess produced energy is stored in the energy storage system.

Similarly, in the case that the produced power output of the wind turbine is below the power reference value, $P_{ref}$, stored energy is retrieved from the energy storage system, and a power level being equal to the power reference value, $P_{ref}$, is supplied to the power grid. Thus, in this case an insufficient power production from the wind turbine, i.e. a power production which is below the requested power level, is accepted. However, in order to ensure that the requested power level is supplied to the grid, energy is retrieved from the energy storage system to compensate for the deficient power production.

Accordingly, the energy storage system is used for absorbing the fluctuations in power production, thereby smoothening the power supplied to the power grid and ensuring that the requested power level is supplied to the power grid. Thus, in the method according to the invention, the wear and loads on the drivetrain and/or pitch system are reduced, while a constant power supply to the power grid is ensured.

The wind turbine may be arranged in a wind power plant, and the power reference value, $P_{ref}$, may be provided by a central power plant controller, and the steps of storing or retrieving energy in/from the energy storage system and supplying power to the power grid may be controlled by the central power plant controller.

According to this embodiment, the central power plant controller determines the power level which is required from the wind turbine. For instance, the power reference value, $P_{ref}$, may be selected with due consideration to power production of other wind turbines of the wind power plant, requirements from the power grid, load considerations, etc. Accordingly, the power reference value, $P_{ref}$, could be the nominal power of the wind turbine, but it could also differ from the nominal power of the wind turbine. Furthermore, the central power plant controller, in this embodiment, controls how energy is stored in and retrieved from the energy storage system, and ensures that the requested power level is supplied to the power grid.

The energy storage system may be connected to at least one further wind turbine of the wind power plant. According to this embodiment, at least two of the wind turbines of the wind power plant share a common energy storage system. Thereby excess power production from one wind turbine may be used for compensating deficient power production from another wind turbine. All of the wind turbines of the wind power plant may share the same energy storage system, or a subset of the wind turbines of the wind power plant may share the same energy storage system.

As an alternative, the steps of storing or retrieving energy in/from the energy storage system and supplying power to the power grid may be controlled by a local wind turbine controller. According to this embodiment, the method of the invention is performed locally, using the local controller of the wind turbine, and independently of the operation of other wind turbines. The wind turbine may, in this case, be a stand-alone wind turbine, even though it is not ruled out that the wind turbine is arranged in a wind power plant. Furthermore, the energy storage system may be a dedicated energy storage system which is only connected to a single wind turbine.

The energy storage system may, in this case, be connected to a DC link of a converter of the wind turbine. According to this embodiment, the excess produced energy is stored in the energy storage system prior to converting it from DC power to AC power. This is in particular an advantage in the case that the energy storage system is a battery, because losses can thereby be minimised.

The energy storage system may comprise a battery. According to this embodiment, the energy is stored in the form of electrical energy. Since the energy produced by the generator of the wind turbine is also in the form of electrical energy, this minimises losses which could be introduced when converting the energy into another form of energy. Another advantage of applying an energy storage system in the form of a battery is that the response time of a battery is very fast, thereby allowing energy to be stored in and retrieved from the energy storage system in a fast manner. In order to allow for using the energy storage system for compensating for fluctuations in the incoming wind, it should be possible to store and retrieve energy at a time scale which is comparable to the time scale of these fluctuations. It is therefore desirable that the energy storage system is designed for allowing energy to be stored or retrieved within approximately 10 seconds.

Alternatively or additionally, the energy storage system may comprise another kind of electrical energy storage device, such as a capacitor. As another alternative, the energy storage system may be a mechanical energy storage system, e.g. including a flywheel. Or the energy storage system may comprise one or more fuel cells, hydro storage, or any other suitable kind of energy storage allowing excess produced energy to be temporarily stored.

The method may further comprise the step of controlling a pitch angle of the wind turbine blades in order to maintain or control the rotational speed of the rotor of the wind turbine in accordance with a reference value. According to this embodiment, the pitch control strategy of the wind turbine is performed on the basis of the rotational speed of the rotor of the wind turbine, rather than on the basis of produced output power.

The method may further comprise the step of providing stability of the power grid by supplying and/or retrieving energy to/from the energy storage system. According to this embodiment, the energy storage system is not only used for compensating fluctuations in output power caused by fluctuations in the incoming wind, but also for providing stability of the power grid. This could, e.g., include adjusting the level of the power supplied to the power grid in order to meet a change in requirements of the power grid. This could be achieved by storing additional energy in the energy storage system when a reduction in supplied power is required and retrieving additional energy from the energy storage system when an increase in supplied power is required.

The method may further comprise the step of supplying power from the energy storage system to the power grid in the case that power production of the wind turbine is stopped. According to this embodiment, energy which was previously stored in the energy storage system may be supplied to the power grid in the case that the wind turbine stops, e.g. due to low wind speeds, failures, maintenance, etc. Thereby such power production interruptions will not affect the power supplied to the power grid, and the wind turbine may therefore still fulfil its obligations towards the power grid.

BRIEF DESCRIPTION OF THE DRAWINGS

The invention will now be described in further detail with reference to the accompanying drawings in which.

DETAILED DESCRIPTION OF THE DRAWINGS

Figure 1:
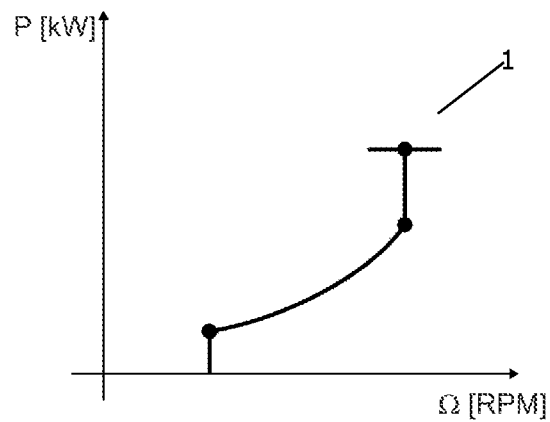
FIG. 1 illustrates output power and generator torque as a function of rotational speed of the generator for a wind turbine being controlled in accordance with a prior art method.
Figure 1:
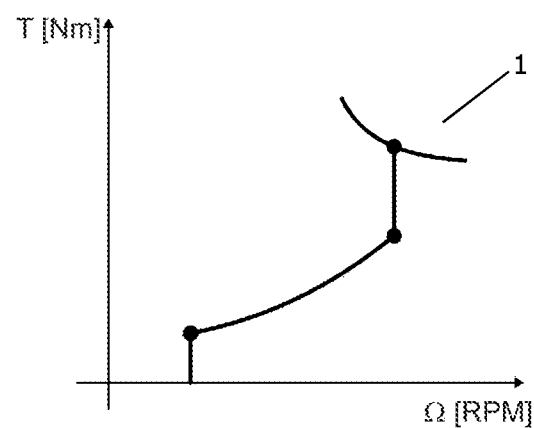

FIG. 1 shows two graphs relating to control of a wind turbine. The upper graph illustrates output power as a function of rotational speed of the generator, and the lower graph illustrates torque on the generator as a function of rotational speed of the generator.

It can be seen that at very low wind speeds, corresponding to very low rotational speeds, there is no power production and no torque on the generator. At intermediate wind speeds, corresponding to the partial load region described above, the output power as well as the torque on the generator increase with increasing rotational speed of the generator. When the full load region 1 is reached, the output power is kept substantially constant at varying rotational speed. In order to obtain this, the torque on the generator is allowed to vary. This introduces loads and consequently wear on the drivetrain and/or pitch system, as described above.

Figure 2:
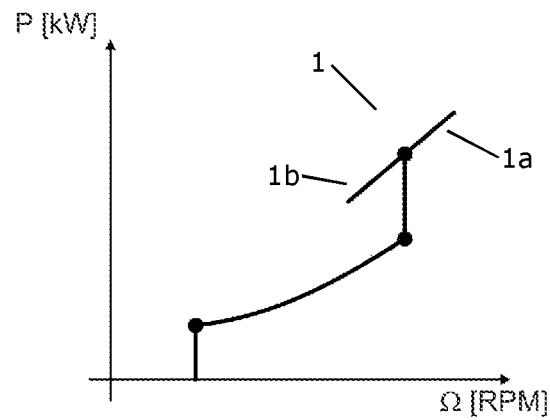
FIG. 2 illustrates output power and generator torque as a function of rotational speed of the generator for a wind turbine being controlled in accordance with a method according to an embodiment of the invention.
Figure 2:
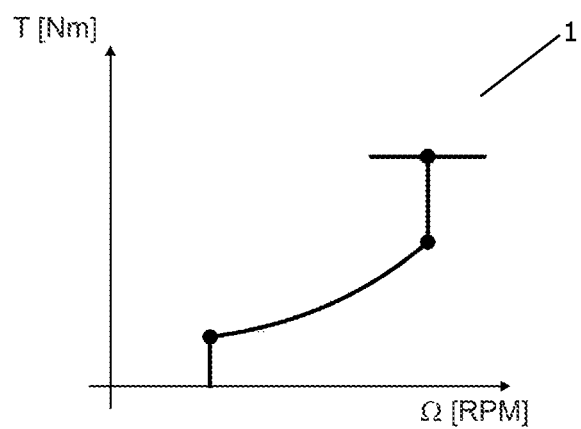

FIG. 2 shows two graphs corresponding to the graphs of FIG. 1. However, in FIG. 2 the wind turbine is controlled in accordance with a method according to an embodiment of the invention. It can be seen that when the full load region 1 is reached, the torque on the generator is maintained constant. Thereby the loads and wear on the drivetrain and/or pitch system are reduced. However, in order to obtain this, the output power is allowed to vary as illustrated in the upper graph. In order to provide a constant power supply to the power grid, the wind turbine comprises an energy storage system allowing energy to be temporarily stored. Thus, when the output power generated by the wind turbine exceeds a power reference value, $P_{ref}$, which the wind turbine is requested to supply to the power grid, excess energy is stored in the energy storage system, and the requested power level is supplied to the power grid. This is the case in region 1a.

Similarly, in the case that the output power generated by the wind turbine is below the power reference value, PR, energy is retrieved from the energy storage system in order to allow the wind turbine to supply the requested power level to the power grid. This is the case in region 1b.

Accordingly, loads and wear on the drivetrain and/or pitch system are minimised, while it is ensured that a requested power level can be supplied to the power grid.

Figure 3:
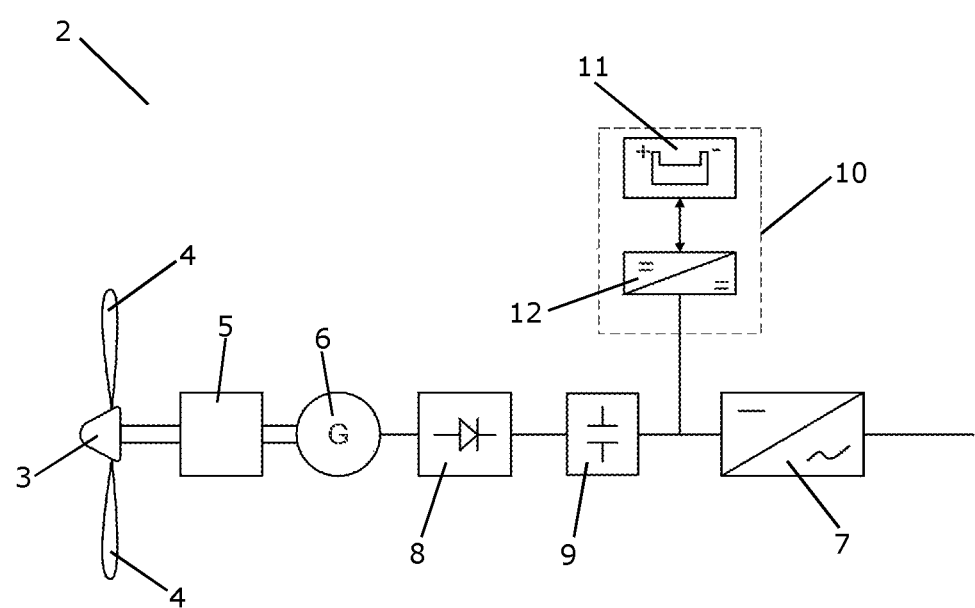
FIG. 3 illustrates a wind turbine being controlled in accordance with an embodiment of the invention.

FIG. 3 is a diagrammatic view of a wind turbine 2 being controlled in accordance with a method according to an embodiment of the invention. The wind turbine 2 comprises a rotor 3 carrying a set of wind turbine blades 4, two of which are shown. The wind turbine 2 further comprises a gearbox 5 connected between the rotor 3 and a generator 6. The generator 6 converts the mechanical energy of the rotating rotor 3 into electrical energy. The electrical output of the generator 6 is connected to a DC/AC converter 7 via a rectifier 8 and a DC link capacitor 9. It should be noted that the rectifier 8 could be replaced by an AC/DC converter. From the DC/AC converter 7, AC power is supplied to a power grid.

An energy storage system 10 is connected to the DC link between the DC link capacitor 9 and the DC/AC converter 7. The energy storage system 10 comprises a battery 11 and a DC/DC converter 12. Accordingly, energy in the form of DC power may be supplied from the DC link to the battery 11, thereby allowing electrical energy to be stored in the battery 11. Similarly, energy in the form of DC power may be retrieved from the battery 11 and supplied to the DC/AC converter 7.

Electrical power produced by the generator 6 may, thus, either be supplied directly to the power grid or be stored in the energy storage system 10. Furthermore, energy stored in the energy storage system 10 may be retrieved and supplied to the power grid, via the DC/AC converter 7. Thereby the energy storage system 10 can be used for compensating for fluctuations of the output power of the wind turbine 2 due to fluctuations in the incoming wind. As described above, this allows a constant torque to be maintained on the generator 6, thereby reducing loads and wear on the drivetrain and/or pitch system, while ensuring that a constant power level is supplied to the power grid. It is noted that the drivetrain includes the gearbox 5 and the generator 6, as well as the shafts interconnecting the rotor 3 and the gearbox 5 and the gearbox 5 and the generator 6, respectively, while the pitch system is used for pitching the wind turbine blades 4.

In the embodiment illustrated in FIG. 3, the energy storage system 10 is connected to a single wind turbine 2 only, i.e. the energy storage system 10 is dedicated to the wind turbine 2 illustrated in FIG. 3.

Figure 4:
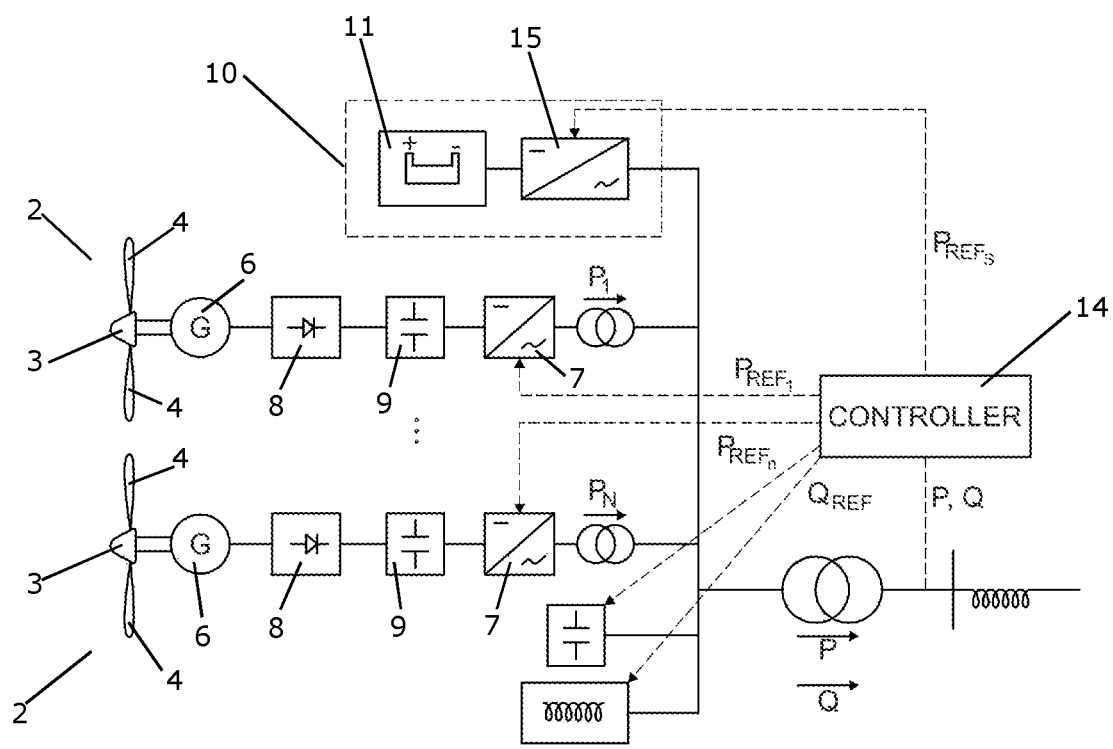
FIG. 4 illustrates a wind power plant comprising a number of wind turbines being controlled in accordance with a method according to an embodiment of the invention.

FIG. 4 illustrates a wind power plant 13 comprising a number of wind turbines 2, two of which are shown. The wind turbines 2 are similar to the wind turbine 2 illustrated in FIG. 3, and they will therefore not be described in detail here.

A central power plant controller 14 is provided for controlling the wind power plant 13, including ensuring that a required power level is supplied to a power grid from the wind power plant 13.

The central power plant controller 14 generates power reference values, $P_{ref}$, for each of the wind turbines 2 of the wind power plant 13, and provides these to the individual wind turbines 2. The power reference values, $P_{ref}$, indicate output power levels which it is desired that the individual wind turbines 2 supply to the power grid. The power reference values, $P_{ref}$, could, e.g., be generated with due consideration to a total required output power from the wind energy plant 13 to the power grid, information regarding the capabilities and restraints of the individual wind turbines 2, information regarding wind conditions, information regarding wake conditions, etc.

Upon receipt of the power reference value, $P_{ref}$, each wind turbine 2 is controlled in such a manner that an output power which is at or near the power reference value, $P_{ref}$, is produced by the wind turbine 2. However, the torque on the generator 6 is maintained at a constant level, and the actual power production of the wind turbine 2 is allowed to fluctuate in order to compensate for fluctuations in the incoming wind.

The AC side of the DC/AC converter 7 of each wind turbine 2 is connected to a common energy storage system 10 comprising a battery 11 and an AC/DC converter 15. When the output power of one of the wind turbines 2 exceeds the power reference value $P_{ref}$ for that wind turbine 2, excess energy is stored in the battery 11 of the common energy storage system 10, and a power level being equal to the power reference value, Ref, is supplied to the power grid. Similarly, when the output power of one of the wind turbines 2 is below the power reference value, $P_{ref}$, for that wind turbine 2, energy is retrieved from the common energy storage system 10 in order to ensure that a power level being equal to the power reference value, $P_{ref}$, can be supplied to the power grid. This is similar to the situation described above with reference to FIG. 3, except that in the embodiment of FIG. 4 the excess energy is stored in a common energy storage system 10 instead of in a dedicated storage system 10 having only one wind turbine 2 connected thereto.

Figure 5:
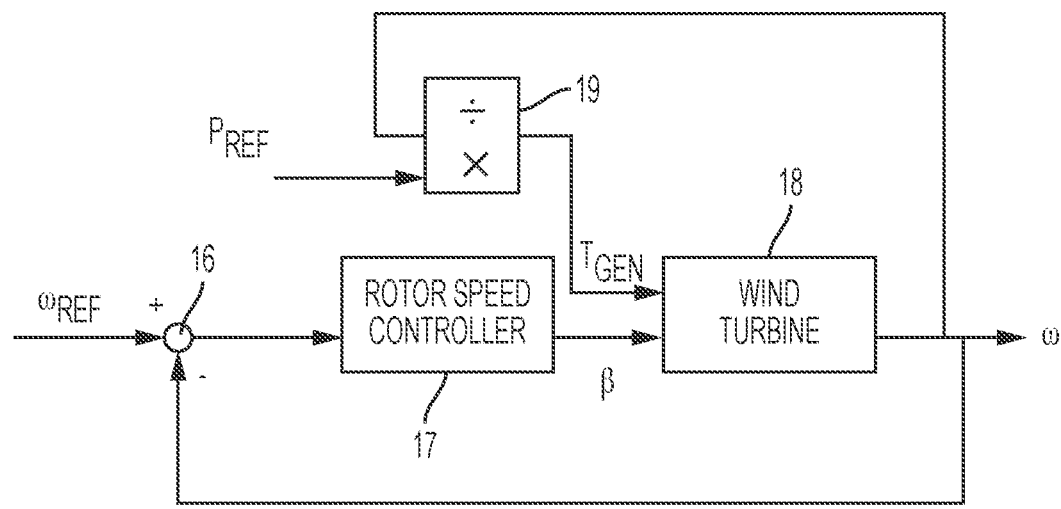
FIGS. 5 and 6 are block diagrams illustrating control of a wind turbine according to a first prior art method and according to a first embodiment of the invention, respectively.

FIG. 5 is a block diagram illustrating a method for controlling a wind turbine according to a first prior art method. A reference rotor speed, $\omega_{ref}$, and a measured rotor speed, $\omega$, are supplied to a subtraction unit 16, and the output of the subtraction unit 16 is fed to a rotor speed controller 17. Based thereon, the rotor speed controller 17 supplies a pitch angle setting, $\beta$, and supplies this to a wind turbine controller 18.

The measured rotor speed, $\omega$, is also supplied to a calculating unit 19, which also receives a power reference value, $P_{ref}$. Based thereon, the calculating unit 19 calculates a generator torque value, $T_{gen}$, and supplies this to the wind turbine controller 18. The wind turbine controller 18 controls the wind turbine in accordance with the received pitch angle setting, $\beta$, and generator torque value, $T_{gen}$.

The generator torque value, $T_{gen}$, is, in this case, calculated as:

$$T_{gen} = \frac{P_{ref}}{\omega}.$$

Thus, when the measured rotor speed, $\omega$, fluctuates, the generator torque, $T_{gen}$, also fluctuates.

Figure 6:
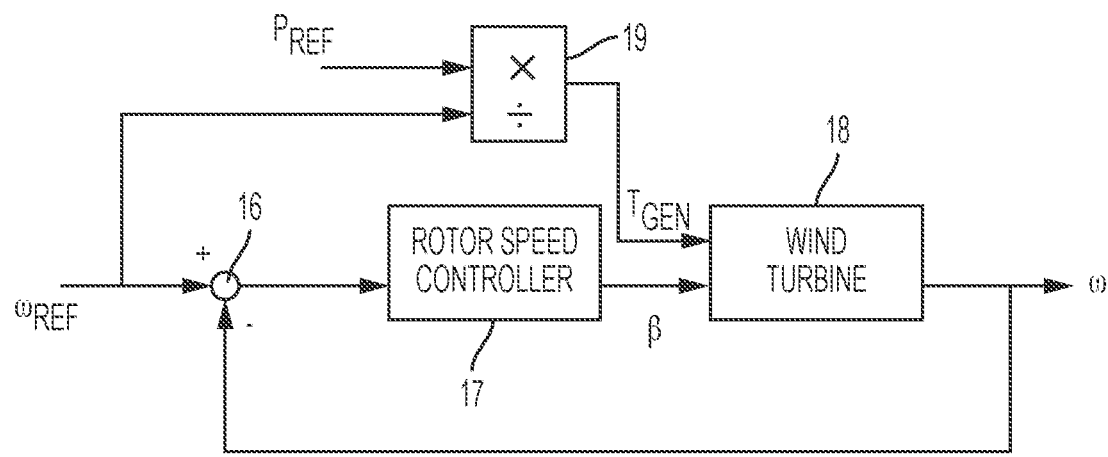

FIG. 6 is a block diagram illustrating a method for controlling a wind turbine in accordance with a method according to a first embodiment of the invention. The method illustrated in FIG. 6 is similar to the method illustrated in FIG. 5. However, in FIG. 6 the reference rotor speed, $\omega_{ref}$, is supplied to the calculating unit 19 instead of the measured rotor speed, $\omega$. Thus, the generator torque value, $T_{gen}$, is, in this case, calculated as:

$$T_{gen} = \frac{P_{ref}}{\omega_{ref}},$$

and accordingly, the generator torque value, $T_{gen}$, is constant.

Figure 7:
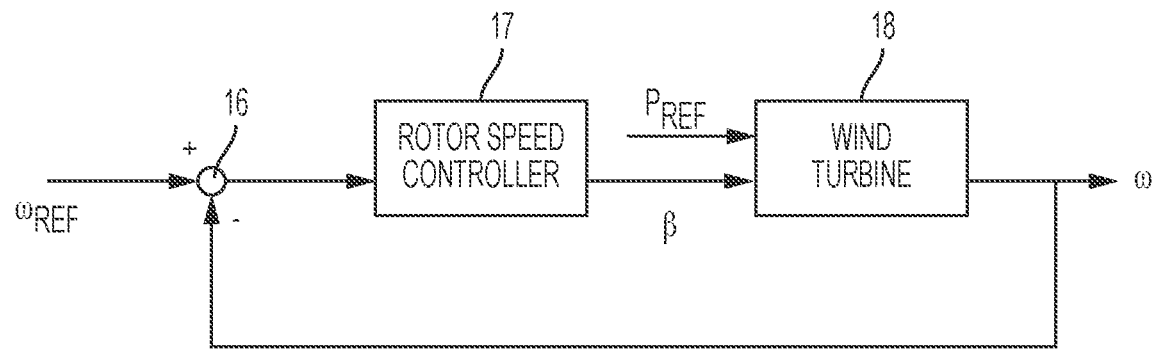
FIGS. 7 and 8 are block diagrams illustrating control of a wind turbine according to a second prior art method and according to a second embodiment of the invention, respectively.

FIG. 7 is a block diagram illustrating a method for controlling a wind turbine according to a second prior art method. The method illustrated in FIG. 7 is similar to the method illustrated in FIG. 5. However, in FIG. 7 the power reference value, $P_{ref}$, is supplied directly to the wind turbine controller 18. Since the generator torque is given by the same equation as above, the generator torque thereby fluctuates when the rotor speed, $\omega$, fluctuates.

Figure 8:
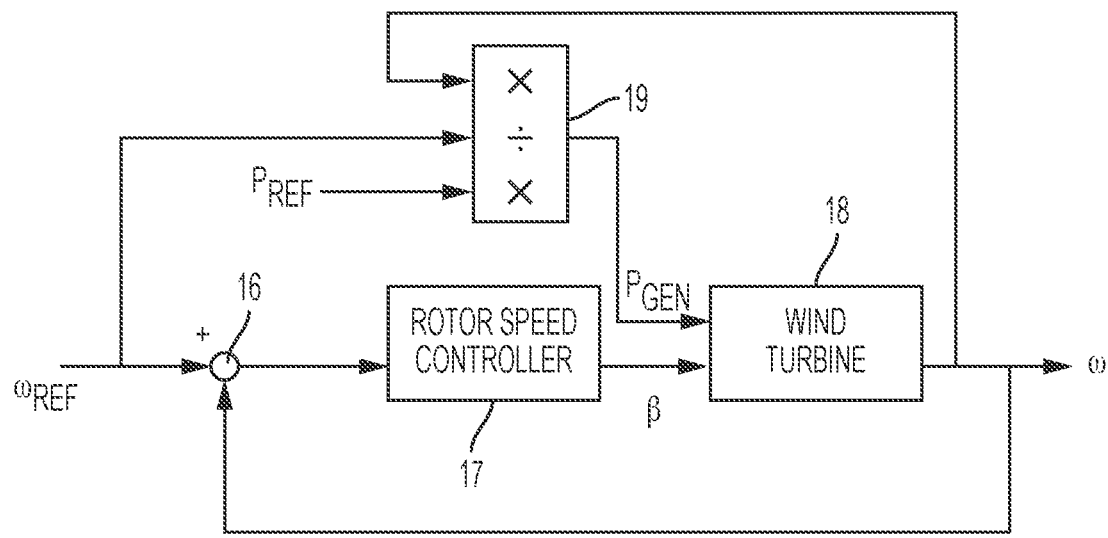

FIG. 8 is a block diagram illustrating a method for controlling a wind turbine in accordance with a method according to a second embodiment of the invention. The method illustrated in FIG. 8 is similar to the method illustrated in FIG. 7. However, in FIG. 8 the measured rotor speed, $\omega$, the reference rotor speed, $\omega_{ref}$, as well as the power reference value, $P_{ref}$, are supplied to a calculating unit 19. Based thereon, the calculating unit 19 calculates a generator power, $P_{gen}$, and supplies this to the wind turbine controller 18 instead of the power reference value, $P_{ref}$. The generator power, $P_{gen}$, is calculated as:

$$P_{gen} = P_{ref} \cdot \frac{\omega}{\omega_{ref}}.$$

The generator torque, $T_{gen}$, is given by:

$$T_{gen} = \frac{P_{gen}}{\omega} = P_{ref} \cdot \frac{\omega}{\omega_{ref} \cdot \omega} = \frac{P_{ref}}{\omega_{ref}}.$$

Thus, the generator torque, $T_{gen}$, in this case, remains constant as the rotor speed, $\omega$, fluctuates.

The invention claimed is:

1. A method for controlling a wind turbine, the wind turbine comprising a rotor carrying a set of wind turbine blades and connected to an input shaft, an output shaft connected to a generator, the generator being arranged to supply power to a power grid, and an energy storage system for intermediate storage of energy produced by the generator, the method comprising:

during full load operation, receiving a power reference value representing a power level to be supplied to the power grid by the wind turbine;

controlling the wind turbine in order to produce a variable output power according to the power reference value while maintaining a constant torque on the generator;

in the case that the variable output power of the wind turbine exceeds the power reference value while maintaining the constant torque on the generator, storing excess produced energy in the energy storage system and supplying a power level being equal to the power reference value to the power grid; and in the case that the variable produced output power of the wind turbine is below the power reference value while maintaining the constant torque on the generator, retrieving stored energy from the energy storage system and supplying a power level being equal to the power reference value to the power grid.

2. The method of claim 1, wherein the wind turbine is arranged in a wind power plant, and wherein the power reference value is provided by a central power plant controller, and the steps of storing or retrieving energy in/from the energy storage system and supplying power to the power grid are controlled by the central power plant controller.

3. The method of claim 2, wherein the energy storage system is connected to at least one further wind turbine of the wind power plant.

4. The method of claim 1, wherein the steps of storing or retrieving energy in/from the energy storage system and supplying power to the power grid are controlled by a local wind turbine controller.

5. The method of claim 4, wherein the energy storage system is connected to a DC link of a converter of the wind turbine.

6. The method of claim 1, wherein the energy storage system comprises a battery.

7. The method of claim 1, further comprising controlling a pitch angle of the wind turbine blades in order to maintain or control the rotational speed of the rotor of the wind turbine in accordance with a reference value.

8. The method of claim 1, further comprising providing stability of the power grid by supplying and/or retrieving energy to/from the energy storage system.

9. The method of claim 1, further comprising supplying power from the energy storage system to the power grid in the case that power production of the wind turbine is stopped.

10. A system, comprising:
a wind turbine, comprising:
a rotor carrying a set of wind turbine blades and connected to an input shaft; and
an output shaft connected to a generator, the generator being arranged to supply power to a power grid;
an energy storage system for intermediate storage of energy produced by the generator; and
a control system configured to perform an operation, comprising:
during full load operation, receiving a power reference value representing a power level to be supplied to the power grid by the wind turbine;
controlling the wind turbine in order to produce a variable output power according to the power reference value while maintaining a constant torque on the generator;
in the case that the variable produced output power of the wind turbine exceeds the power reference value while maintaining the constant torque on the generator, storing excess produced energy in the energy storage system and supplying a power level being equal to the power reference value to the power grid; and
in the case that the variable output power of the wind turbine is below the power reference value while maintaining the constant torque on the generator, retrieving stored energy from the energy storage system and supplying a power level being equal to the power reference value to the power grid.

11. The system of claim 10, wherein the energy storage system is connected to at least one further wind turbine of a wind power plant comprising the wind turbine.

12. The system of claim 10, wherein the energy storage system is connected to a DC link of a converter of the wind turbine.

13. The system of claim 10, wherein the energy storage system comprises a battery.

14. The system of claim 10, wherein the operation further comprises controlling a pitch angle of the wind turbine blades in order to maintain or control the rotational speed of the rotor of the wind turbine in accordance with a reference value.

* * * * *